No. 842,167. PATENTED JAN. 29, 1907.
J. BERG.
MEASURING MACHINE.
APPLICATION FILED MAR. 21, 1906.

3 SHEETS—SHEET 1.

Witnesses.
B. Sheffield
H. L. Trimble.

Inventor.
John Berg
by Chas & Niles
his Attorney

No. 842,167. PATENTED JAN. 29, 1907.
J. BERG.
MEASURING MACHINE.
APPLICATION FILED MAR. 21, 1906.

3 SHEETS—SHEET 2.

No. 842,167. PATENTED JAN. 29, 1907.
J. BERG.
MEASURING MACHINE.
APPLICATION FILED MAR. 21, 1906.

3 SHEETS—SHEET 3.

Witnesses.
O. B. Sheffield
H. L. Trimble.

Inventor.
John Berg
by Chas. H. Miles
his Attorney.

UNITED STATES PATENT OFFICE.

JOHN BERG, OF ANDERSON, INDIANA.

MEASURING-MACHINE.

No. 842,167.   Specification of Letters Patent.   Patented Jan. 29, 1907.

Application filed March 21, 1906. Serial No. 307,195.

*To all whom it may concern:*

Be it known that I, JOHN BERG, of Anderson, in the county of Madison and State of Indiana, one of the United States of America, temporarily residing at the city of Toronto, in the county of York and Province of Ontario, Canada, have invented certain new and useful Improvements in Measuring-Machines; and I hereby declare that the following is a full, clear, and exact description of the same.

This invention relates to a measuring-machine constructed, arranged, and operated as hereinafter described, and specifically pointed out in the appended claims.

For a full understanding of the invention reference is to be had to the following description and to the accompanying drawings, in which—

Figure 1:
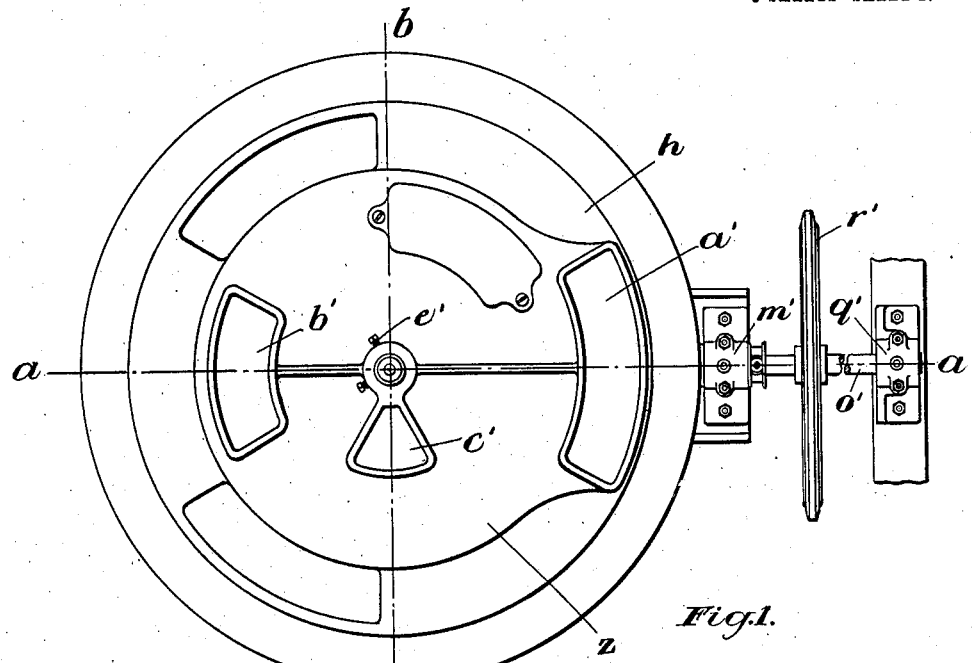
Figure 2:
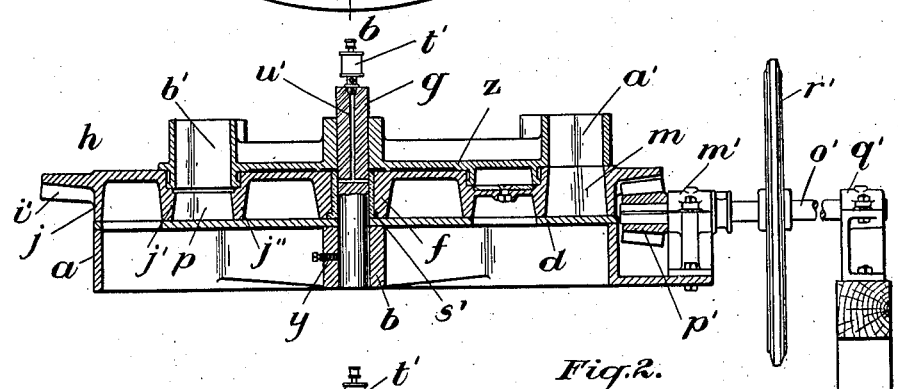
Figure 3:
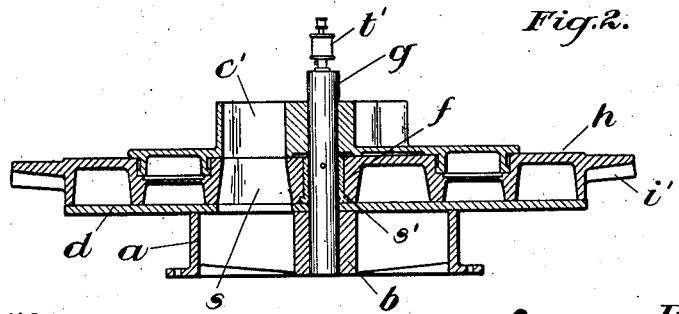
Figure 4:
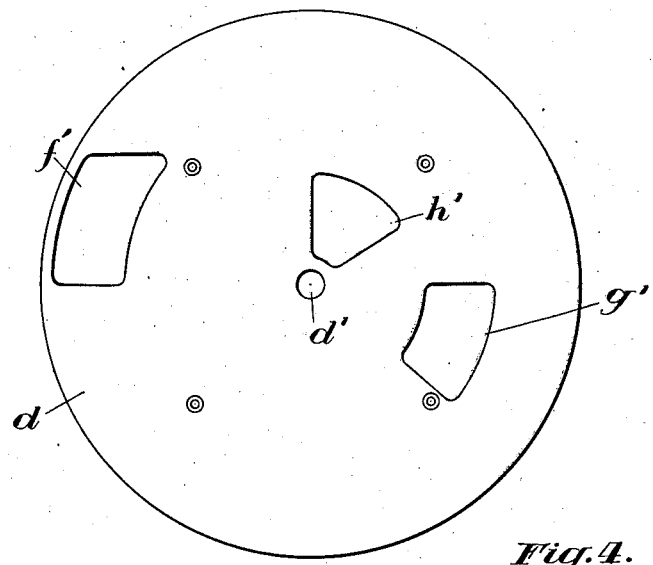
Figure 5:
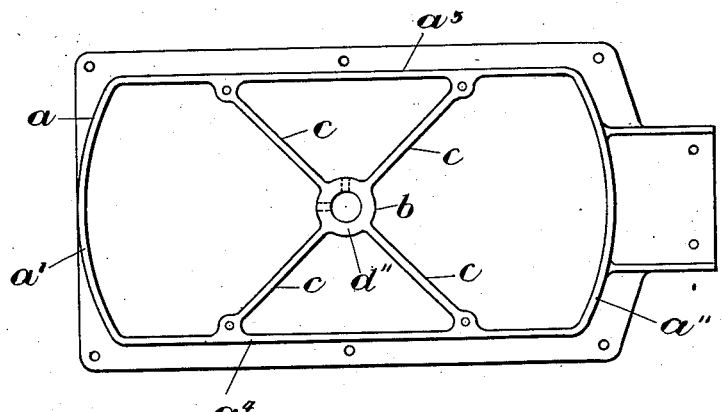
Figure 6:
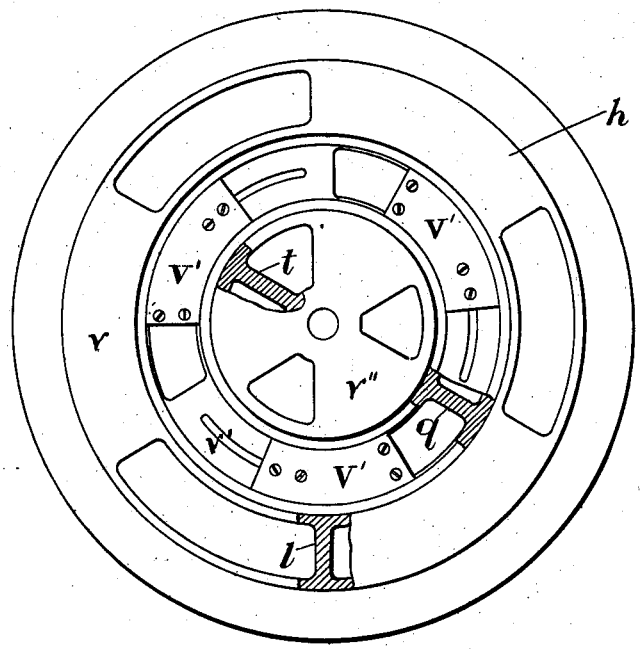
Figure 7:

Figure 1 is a plan view of the measuring-machine looking at it from the top. Fig. 2 is a vertical section on the lines $a\ a$, Fig. 1. Fig. 3 is a sectional view similar to Fig. 2 on the lines $b\ b$, Fig. 1. Fig. 4 is a plan view of the stationary bottom for the measures. Fig. 5 is a plan view of the bed, and Fig. 6 is a plan view of the measuring means. Fig. 7 is a side elevation of the adjusting-gate.

Like letters of reference refer to like parts throughout the specification and drawings.

The measuring-machine shown in the accompanying drawings consists, essentially, of a stationary bed $a$, a stationary bottom $d$, supported upon the bed, and one or more sets of measures mounted to collectively revolve upon the stationary bottom.

As shown in Figs. 2, 3, and 5, the bed $a$ consists of a unitary casting composed of four sides $a'$, $a''$, $a^3$, and $a^4$, arranged in oppositely-disposed and parallel pairs, and a hollow hub $b$, centrally located between the sides of the bed and rigidly connected therewith by braces $c$ with its top surface $d''$ in the same plane as the top of the sides to constitute a support for the center of the stationary bottom $d$.

The stationary bottom $d$ is preferably of an annular formation, as shown in Fig. 4, and formed centrally through it is an aperture $d'$ to register with the bore of the hub $b$.

The measuring means consists of a unitary casting composed of a plate $h$, a centrally-located hollow hub $f$, and a series of annular flanges $j$, $j'$, and $j''$, extending from the plate $h$ to the top surface of the stationary bottom $d$ and concentrically arranged with the hub $f$.

Stationarily contained within the hub $b$ is the lower end of a post $g$, which projects through the aperture $d'$ in the stationary bottom $d$ and through the bore of the hub $f$ to center these parts and to constitute a fixed axis around which the measuring means can revolve during the operation of the machine, and extending through the hub $b$ is a set-screw $y$, which engages the post and holds it in a fixed position. Formed through the post $g$ is an oil-channel $u'$, leading from the top of the stationary post to the bore of the hub $f$. Fitted to the stationary post is an oil-cup $t'$ to furnish lubricant to the oil-channel to lubricate the bore of the hub, which is preferably provided with an antifriction-bushing $s'$ to contact the post $g$.

The annular flange $j$ is located contiguous to the rim of the plate $h$. Within the circle of the flange $j$ and concentric with it is the annular flange $j'$. Connecting the flanges $j$ and $j'$ at selected places are ribs $l$, which extend from the top to the bottom of the flanges $j$ and $j'$ to form, with the flanges, a set of bottomless measures $m$, which extend to the top surface of the plate $h$. The measures $m$ are arranged in a circle concentric with the center of the hub $f$, and within the circle of the measures $m$ and concentric therewith is a second set of similar bottomless measures $p$, formed by ribs $q$, connected to the flanges $j'$ and $j''$. Within the circle of the measures $p$ is a third set of similar bottomless measures $s$, formed by ribs $t$, connected to the flange $j''$ and hub $f$.

As shown in Fig. 6, closed intervals $v$, $v'$, and $v''$ exist between the measures $m$, $p$, and $s$, respectively, which operate as valves to cut off the supply of material from the supply source, as hereinafter stated. Located above the measuring means is a covering-plate $z$, consisting of a unitary casting stationarily secured to the stationary post $g$ by set-screws or bolts $e'$. Formed through the covering-plate $z$ are three apertures $a'$, $b'$, and $c'$, with which register the measures $m$, $p$, and $s$, respectively, as the measuring means revolve, and formed through the stationary bottom $d$ at selected places, but out of line with the apertures $a'$, $b'$, and $c'$, are apertures $f'$, $g'$, and $h'$, with which register the bottomless measures $m$, $p$, and $s$ during the revolution of the measuring means.

The rim of the plate $h$ projects beyond the flange $j$, and on the under side of it are formed gear-teeth $i'$. Journaled in the bearings $m'$ and $q'$ is a counter-shaft $o'$, having a pinion-wheel $p'$, meshing with the gear-teeth $i'$, and mounted on the counter-shaft $o'$ between the bearings $m'$ and $q'$ is a pulley $r'$, by which motion is transmitted to the counter-shaft.

The construction, formation, and arrangement of the parts above mentioned have been specifically stated; but they can be varied within the scope of the appended claims without departing from the nature of the invention.

Motion is transmitted by the pulley $r'$ to the counter-shaft $o'$ and pinion-wheel $p'$. The rotation of the pinion-wheel $p'$ causes the revolution of the unitary casting around the stationary post $g$ to successively bring the bottomless measures $m$ into position to register with the apertures $a'$ and receive their complements of material from the source of supply with which the aperture $a'$ is connected. To prevent the continuous flow of material through the aperture $a'$, the closed intervals $v$ are arranged to exist between the measures $m$ to contact the under side of the covering-plate $z$ and operate as valves to close the aperture $a'$, except when one of the measures $m$ registers with it. The material is prevented from passing out of the bottomless measures $m$ by the stationary bottom $d$ until the former successively register with the aperture $f'$, at which place the material is dumped by its own gravity from the bottomless measures $m$ through the stationary bottom. The bottomless measures $p$ while the measuring means revolve successively come into position opposite the apertures $b'$ and receive the material from the source of supply with which the aperture $b'$ is connected to carry it to the aperture $g'$, through which the material is dumped from the measures $p$, and as the bottomless measures $s$ come into position opposite the aperture $c'$ they successively receive their complements of material from the supply-source with which the aperture $c'$ is connected and carry it to the aperture $h'$, through which the material is dumped from the measures $s$. The closed intervals $v'$ and $v''$ operate to close the apertures $b'$ and $c'$ in the same way as the closed intervals $v$ operate to close the aperture $a'$. It may be necessary under certain conditions to vary the capacities of the measures $p$, and this is accomplished by adjustably attaching to the annular plate $h$ gates $V''$, which can be positioned to regulate the capacities of the measures $p$ and the apertures $r$ opening thereinto. The gates $V''$, as shown in Fig. 7, consist of covering-plates $V''$ and side plates $v^3$, extending from the covering-plates to the bottom of the measures $s$, to form side walls for the measures, which will act as substitutes for the ribs $q$.

The measuring-machine above described is particularly adapted for proportionally and approximately measuring different materials which are to be intimately mixed, such as sand, lime, and coloring-matter for the manufacture of bricks; but it may be employed for measuring other materials for other purposes, and it therefore is not desired to confine the use of the machine to any specific purpose.

Having thus fully described my invention, what I claim as new, and desire to secure by Letters Patent, is—

1. A measuring-machine comprising a stationary bed consisting of an open framework with a centrally-located hub connected by arms to the sides thereof, a plate stationarily supported upon the top of the bed having a centrally-located aperture registering with the bore of the hub, a post stationarily contained in the bore of the hub and extending through said aperture and above said plate, a measuring means mounted to revolve upon said plate and having a centrally-located hub, through the bore of which extends said post, said measuring means comprising a unitary casting consisting of a surface plate, a series of flanges projecting downwardly from the surface plate and arranged concentrically with the hub of the measuring means and laterally-arranged ribs connecting the flanges at selected places to form the measures, said measuring means having apertures through the surface plate forming entrances to the measures, a stationary covering-plate for the measuring means having a hub centered on said post and apertures opposed to the paths of said measures to register therewith as the measures revolve, and the first-mentioned plate having apertures to register with said measures as the latter revolve, said apertures being out of line with the corresponding apertures of the covering-plate.

2. A measuring-machine comprising a stationary bed consisting of an open framework with a centrally-located hub connected by arms to the sides thereof, a plate stationarily supported upon the top of the bed having a centrally-located aperture registering with the bore of the hub, a post stationarily contained in the bore of the hub and extending through said aperture and above said plate, a measuring means mounted to revolve upon said plate and having a centrally-located hub, through the bore of which extends said post, said measuring means comprising a unitary casting consisting of a surface plate, a series of flanges projecting downwardly from the surface plate and arranged concentrically with the hub of the measuring means and laterally-arranged ribs connecting the flanges at selected places to form the measures, said measuring means having apertures through the surface plate forming entrances to the measures, a stationary covering-plate for the measuring means having a hub centered on said post and apertures opposed to the paths of said measures to register therewith as the measures revolve, the first-mentioned plate having apertures to register with said measures as the latter revolve, said apertures being out of line with the corresponding apertures of the covering-plate, and means for causing the revolution of the measures.

3. A measuring-machine comprising a stationary bed consisting of an open framework with a centrally-located hub connected by arms to the sides thereof, a plate stationarily supported upon the top of the bed having a centrally-located aperture registering with the bore of the hub, a post stationarily contained in the bore of the hub and extending through said aperture and above said plate, a measuring means mounted to revolve upon said plate and having a centrally-located hub, through the bore of which extends said post, said measuring means comprising a unitary casting consisting of a surface plate, a series of flanges projecting downwardly from the surface plate and arranged concentrically with the hub of the measuring means and laterally-arranged ribs connecting the flanges at selected places to form the measures, said measuring means having apertures through the surface plate forming entrances to the measures, a stationary covering-plate for the measuring means having a hub centered on said post and apertures opposed to the paths of said measures to register therewith as the measures revolve, the first-mentioned plate having apertures to register with said measures as the latter revolve, said apertures being out of line with the corresponding apertures of the covering-plate, adjustable gates for one of said sets of measures comprising arc-shaped plates slidable over the entrances to said measures, slots in the surface plate of the measuring means intermediate said measures and set-screws inserted through said slots to enter the arc-shaped plates and adjustably connect them to the surface plate.

Toronto, March 2, 1906.

JOHN BERG.

In presence of—
　CHAS. H. NUHR,
　L. F. BROCK.